United States Patent
Chou

(10) Patent No.: US 7,924,514 B2
(45) Date of Patent: Apr. 12, 2011

(54) MOVEABLE ASSEMBLY, MICROACTUATOR HAVING SAME, AND CAMERA MODULE INCLUDING THE MICROACTUATOR

(75) Inventor: Tai-Hsu Chou, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 169 days.

(21) Appl. No.: 12/435,406

(22) Filed: May 5, 2009

(65) Prior Publication Data

US 2009/0279190 A1 Nov. 12, 2009

(30) Foreign Application Priority Data

May 6, 2008 (CN) .......................... 2008 1 0301432

(51) Int. Cl.
*G02B 7/02* (2006.01)

(52) U.S. Cl. ........ 359/814; 359/824; 977/725; 331/154; 313/495

(58) Field of Classification Search .................. 359/814, 359/824, 822, 223, 224; 310/12.01, 309; 248/566; 331/154; 977/725, 742, 752, 762, 977/840; 438/50, 53, 197; 417/426; 257/183, 288, 315, 415, 419, 424; 313/495

See application file for complete search history.

(56) References Cited

U.S. PATENT DOCUMENTS

| | | | | |
|---|---|---|---|---|
| 7,053,520 B2 * | 5/2006 | Zetti et al. | ..................... | 310/309 |
| 7,405,854 B2 * | 7/2008 | Desai et al. | ................. | 359/224.1 |
| 7,453,183 B2 * | 11/2008 | Zettl et al. | ..................... | 310/309 |
| 7,602,097 B2 * | 10/2009 | Nakamura | ..................... | 310/309 |
| 7,671,397 B2 * | 3/2010 | Fujita et al. | ................... | 257/315 |
| 7,675,698 B2 * | 3/2010 | Desai et al. | ................. | 359/896 |
| 7,710,012 B2 * | 5/2010 | Fujieda et al. | ................ | 313/495 |
| 7,835,055 B2 * | 11/2010 | Desai | ........................ | 359/224.1 |

* cited by examiner

*Primary Examiner* — Loha Ben

(74) *Attorney, Agent, or Firm* — Raymond J. Chew

(57) ABSTRACT

A moveable assembly includes a frame, resilient suspension arms made of carbon nanotube bundles, and a moveable member. The frame is disposed around the moveable member. Each of the resilient suspension arms includes a first end fixed to the frame, and a second end connected to the moveable member. The resilient suspension arms are centro-symmetrically arranged relative to the moveable member such that the moveable member is capable of stably moving along a predetermined direction driven by an external force.

19 Claims, 5 Drawing Sheets

MOVEABLE ASSEMBLY, MICROACTUATOR HAVING SAME, AND CAMERA MODULE INCLUDING THE MICROACTUATOR

BACKGROUND

1. Technical Field

The present invention generally relates to a movable assembly with resilient function, to micro actuators, and to camera modules that employ micro actuators.

2. Discussion of Related Art

With the rapid development of optical imaging technology, lens modules are now widely used in a variety of electronic devices, such as digital cameras and mobile phones.

To achieve focusing capability in micro camera modules, a micro actuator is employed to move one or more lens groups in the micro camera module. Generally, a micro actuator includes a moveable member, a driver configured to apply a force to the moveable member thereby moving the moveable member, and several resilient members for resetting the moveable member to its original position. The resilient members can be spring plates, which are made by etching a copper or a silicon plate. For each spring plate, a high depth-width ratio of the precursor copper or silicon plate is required to provide the needed stability and resilient force of the spring plate finally produced. However, if the width of the precursor copper or silicon plate is large, the etching process can be unduly difficult. In addition, if the width of the precursor copper or silicon plate is large, a volume of the spring plate is correspondingly large, which militates against the trend toward miniaturization of micro actuators.

Therefore, there is a need to overcome the aforementioned problems.

BRIEF DESCRIPTION OF THE DRAWINGS

Many aspects of the present moveable assembly, micro actuator and camera module can be better understood with reference to the following drawings. The components in the drawings are not necessarily drawn to scale, the emphasis instead being placed upon clearly illustrating the principles of the present moveable assembly, micro actuator and camera module. In the drawings, all the views are schematic.

DETAILED DESCRIPTION OF EXEMPLARY EMBODIMENTS

Figure 1:
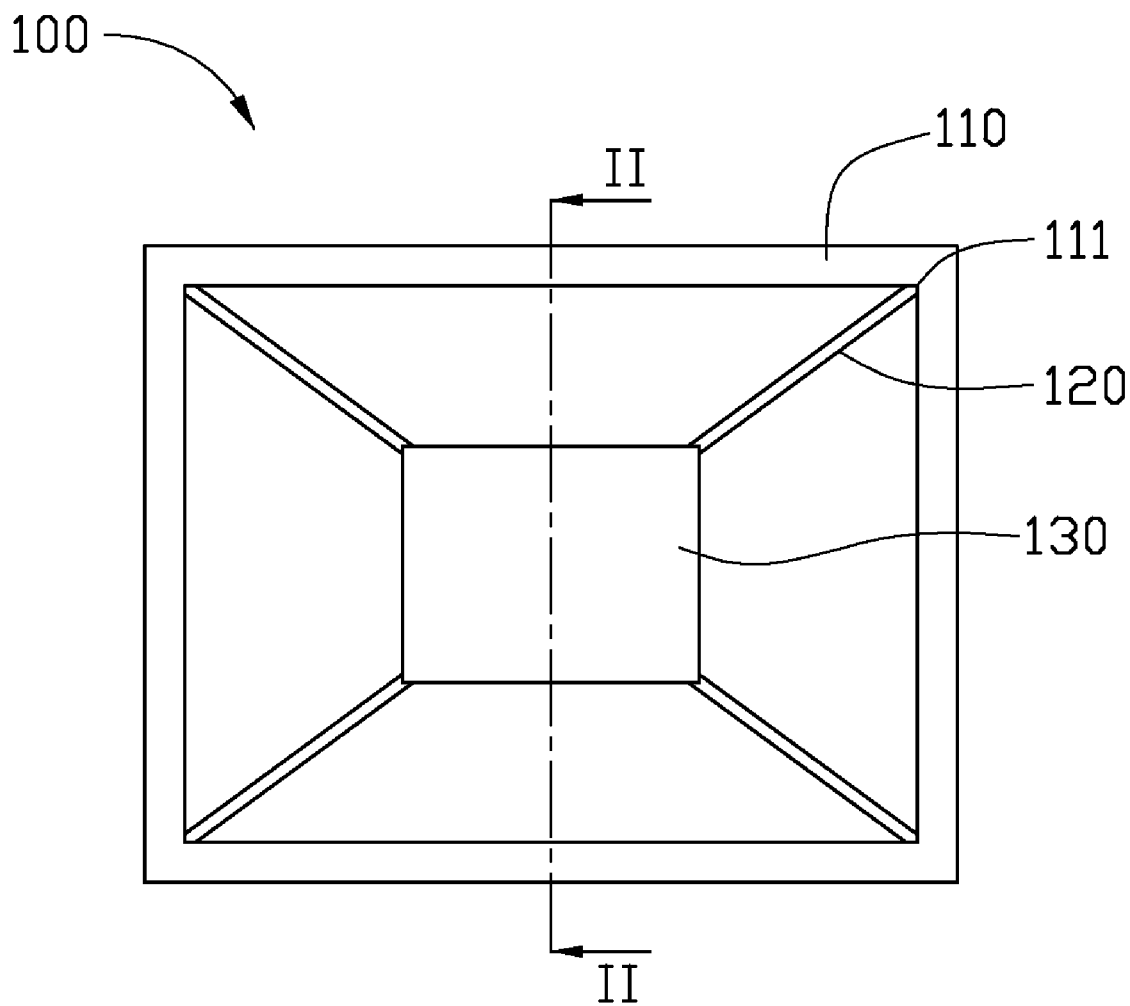
FIG. 1 is a schematic view of a moveable assembly in accordance with a first embodiment.
Figure 2:
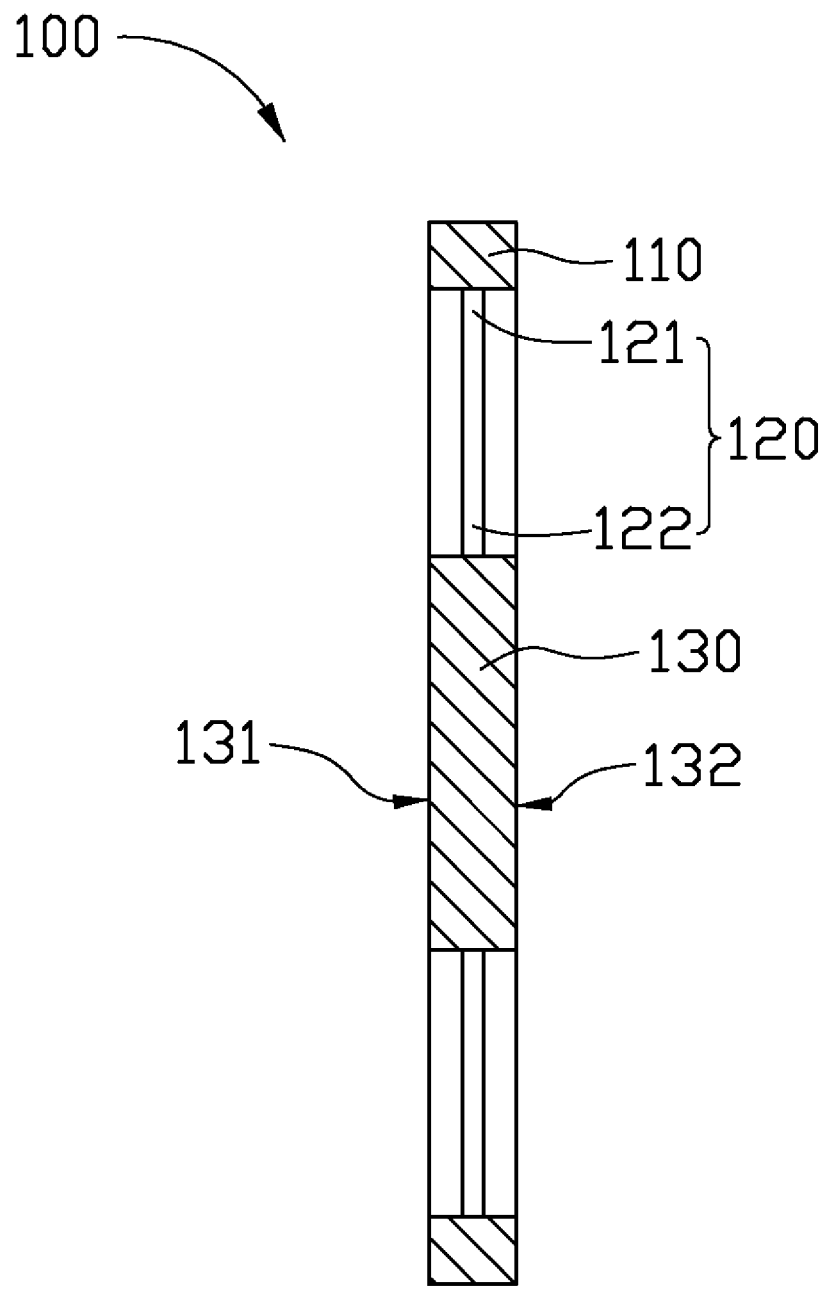
FIG. 2 is a cross sectional view taken along line II-II of FIG. 1.
Figure 4:
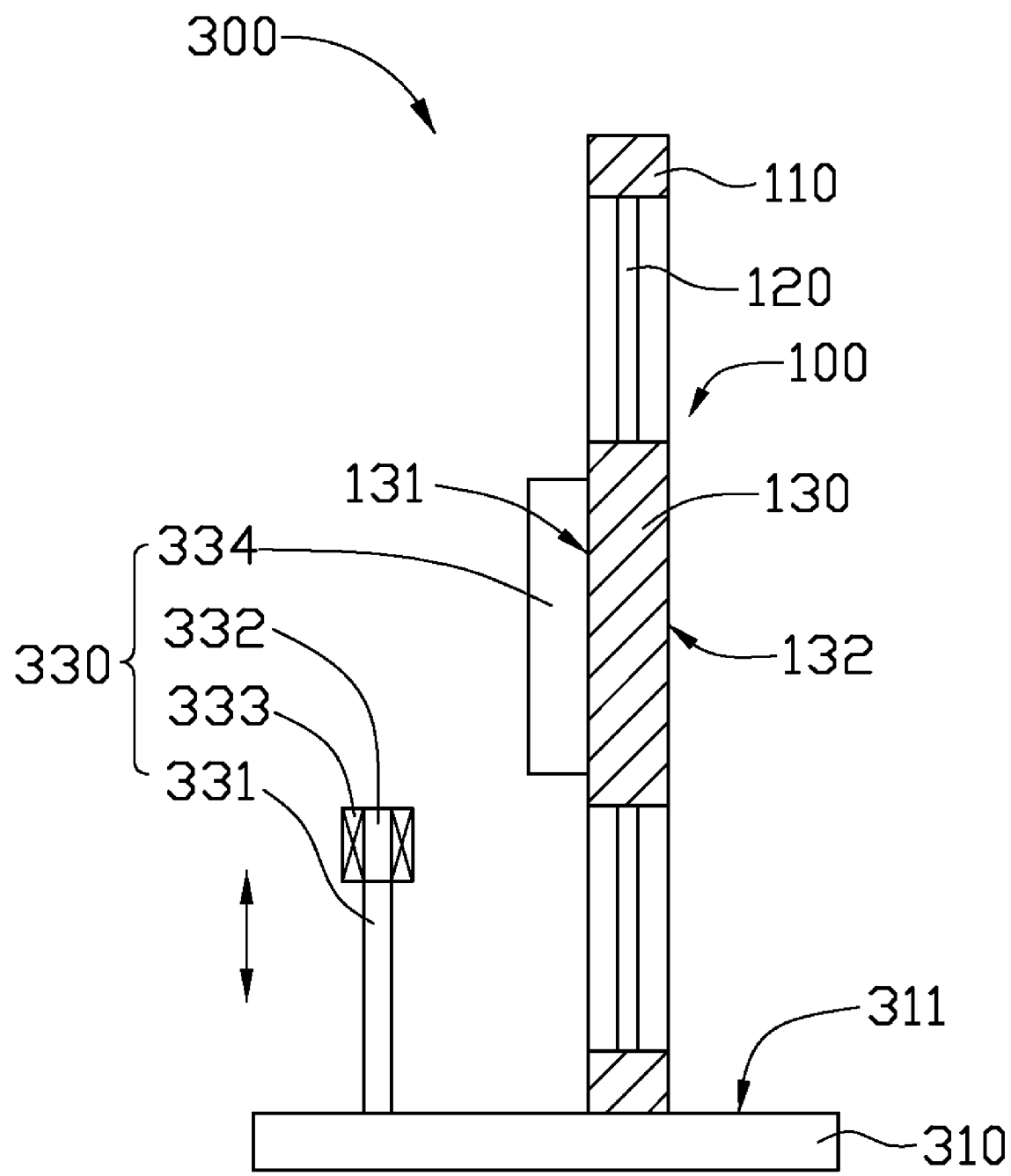
FIG. 4 is a schematic view showing a micro actuator in accordance with a third embodiment, the micro actuator including the moveable assembly of FIG. 1.

Referring to FIGS. 1 and 2, a moveable assembly 100 includes a frame 110, four resilient suspension arms 120, and a moveable member 130. Referring also to FIG. 4, the moveable assembly 100 can for example be employed in a micro actuator 300.

The frame 110 is rectangular and has four corners 111 at four vertexes thereof. Alternatively, the frame 110 can have other shapes, for example, round, elliptical, polygonal, etc.

The frame 110 is made of material that can act as a catalyst to grow carbon nanotubes. Examples of such material include iron, cobalt, nickel, iron oxide, cobalt oxide, nickel oxide (NiO), and any suitable combination thereof.

The four resilient suspension arms 120 have the same structure and size. Each of the four resilient suspension arms 120 includes a first end 121 fixed to a corresponding corner 111, and a second end 122 fixed to a corresponding corner (not labeled) of the moveable member 130. The four resilient suspension arms 120 are centro-symmetrically arranged relative to the moveable member 130. That is, two of the resilient suspension arms 120 are at a first side of the moveable member 130, and the other two resilient suspension arms 120 are at an opposite second side of the moveable member 130. In the present embodiment, each of the four resilient suspension arms 120 lies in a connecting line (not shown) that runs between a center point of the moveable member 130 and a corresponding corner 111.

Each of the resilient suspension arms 120 is comprised of one or more carbon nanotube bundles, each nanotube bundle including a number of carbon nanotubes. The carbon nanotubes can be single-walled carbon nanotubes, double-walled carbon nanotubes, multi-walled carbon nanotubes, or any combination thereof. A diameter of each of the carbon nanotubes can for example be larger than 10 nanometers, and a length of each of the carbon nanotubes can be in a range from about 100 micrometers to about 2 centimeters. In the present embodiment, the length of each of the carbon nanotubes is substantially equal to the length of the resilient suspension arm 120. In other words, one end of the carbon nanotube is connected to the movable member 130, and the other end of the carbon nanotube is connected to the corresponding corner 111 of the frame 110. The carbon nanotubes in each carbon nanotube bundle are substantially parallel to each other, and substantially parallel to a lengthways direction of the carbon nanotube bundle. In turn, each carbon nanotube bundle is substantially parallel to a lengthwise direction of the resilient suspension arm 120.

The moveable member 130 is a plate having a first surface 131 and a second surface 132 at opposite sides thereof. The frame 110 defines an imaginary plane, and the moveable member 130 is coplanar with the imaginary plane. Similar to the frame 110, the moveable member 130 can also be made of material that can act as a catalyst to grow carbon nanotubes.

The resilient suspension arms 120 made from one or more carbon nanotube bundles typically have excellent properties in terms of high tensile strength and toughness. As such, a volume of both the moveable assembly 100 and the corresponding micro actuator 300 can be reduced.

Figure 3:
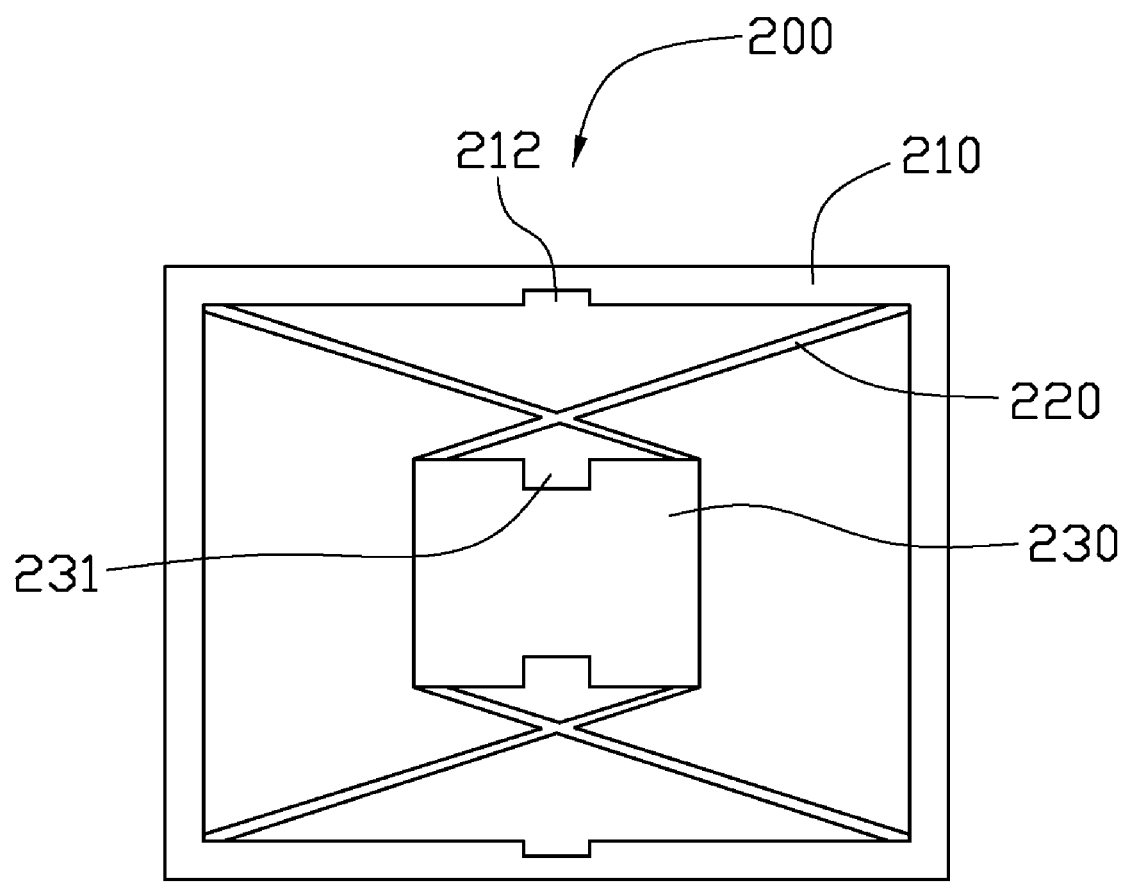
FIG. 3 is a schematic view of a moveable assembly in accordance with a second embodiment.

As shown in FIG. 3, a moveable assembly 200 in accordance with a second exemplary embodiment includes a frame 210, four resilient suspension arms 220 and a moveable member 230. The moveable assembly 200 is similar to the moveable assembly 100, except that, among other things, two of the resilient suspension arms 220 at a first side of the moveable member 230 cross each other, and the other two resilient suspension arms 220 at an opposite second side of the moveable member 230 also cross each other.

Two first notches 231 are defined in the first side and the second side of the moveable member 230, respectively. Each of the first notches 231 is opposite to an intersection of the two corresponding resilient suspension arms 220. The frame 210 defines two second notches 212. Each of the two second notches 212 is generally opposite to a corresponding first notch 231. The first and second notches 231, 212 are configured for receiving portions of the corresponding resilient suspension arms 220 when the resilient suspension arms 220 bend.

The resilient suspension arms 120, 220 in the moveable assemblies 100, 200 can be directly grown on the frames 110, 210. Alternatively, the resilient suspension arms 120, 220 can be firstly manufactured separately, and then assembled together with the frames 110, 210. The carbon nanotube bundles can be drawn out of a carbon nanotube array, and the carbon nanotube array can be made using a chemical vapor deposition process. The two ends of the resilient suspension arms 120, 220 can be respectively welded or sintered with the frames 110, 210 and the moveable member 130, 230 using a laser.

Referring to FIG. 4, a micro actuator 300 in accordance with an exemplary embodiment includes a base 310, the moveable assembly 100 and a driver 330.

The base 310 includes a plane surface 311. The driver 330 includes a supporting pole 331 perpendicularly fixed to the plane surface 311, an iron core 332 disposed on a distal end of the supporting pole 331, a coil 333 coiled around the iron core 332, and a magnet 334 attached to the moveable member 230 of the moveable assembly 100. The iron core 332 and the coil 333 cooperatively constitute an electromagnet.

When a current is applied to the coil 333, the coil 333 produces a magnetic force in order to move the magnet 334 and thereby move the moveable member 130 of the moveable assembly 100 in unison with the magnet 334. Simultaneously, the resilient suspension arms 120 apply resilient force to the moveable member 130. If the magnetic force is larger than the resilient force, the moveable member 130 moves until the resilient suspension arms 120 apply resilient force equal in magnitude to the magnetic force. Thus, a displacement of the moveable member 130 is in proportion to the magnetic force produced by the coil 333. As such, a displacement of the moveable member 130 can be adjusted by changing the current applied to the coil 333.

Figure 5:
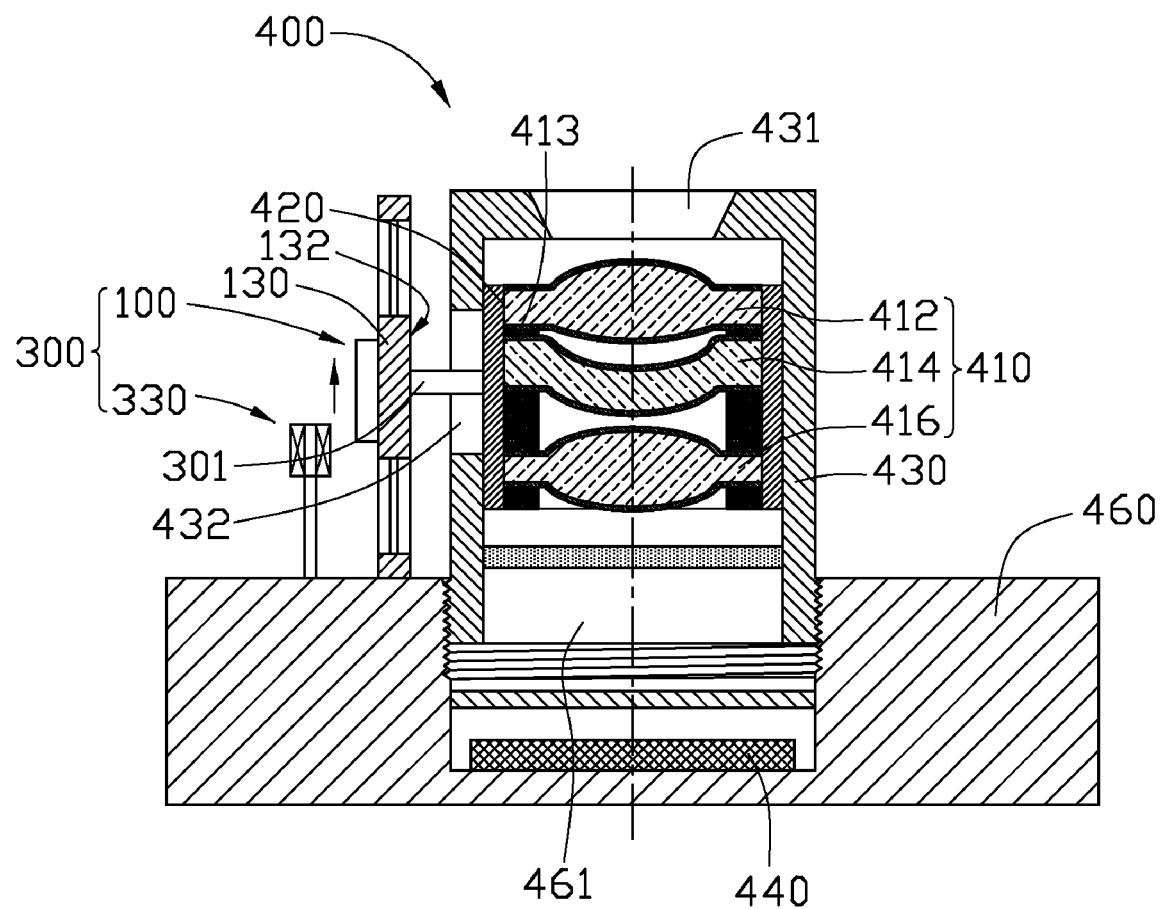
FIG. 5 is a schematic view showing a camera module in accordance with a fourth embodiment, the camera module including the micro actuator of FIG. 4.

FIG. 5 illustrates a camera module 400, which includes a lens group 410, a lens holder 420, a barrel 430, an image sensor 440, the micro actuator 300, and a barrel holder 460. The lens group 410 and the lens holder 420 are all received in the barrel 430. The image sensor 440 is mounted in the barrel holder 460.

The lens group 410 includes a first lens 412, a second lens 414 and a third lens 416. The first, second, and third lenses 412, 414, 416 can be comprised of plastic or glass. In various embodiments of the camera module 400, the number of lenses in the lens group 410 may vary according to practical requirements. A spacer 413 is sandwiched between each two neighboring lenses 412, 414, 416 in the lens group 410. The lens holder 420 is cylindrical and receives the first, second, and third lenses 412, 414, 416. In addition, the first, second, and third lenses 412, 414, 416 can be fixed to an inner sidewall of the lens holder 420 by adhesive (glue). Optionally, the lens group 410 can further include one or more filters (e.g., one or more IR-cut filters).

The barrel 430 defines an aperture 431 at an object side of the lens group 410. The barrel 430 also includes a thread formed around an outer surface thereof. The barrel holder 460 includes a cylindrical inner sidewall which defines an opening 461. An inner screw thread is formed on the inner sidewall of the barrel holder 460. The barrel 430 is screwed into the opening 461 via the outer screw thread and the inner screw thread.

The barrel 430 also defines a guide slot 432 along a longitudinal (lengthwise) direction thereof. The camera module 400 further includes a connecting arm 301 which passes through the guide slot 432 and connects the moveable member 130 to the lens holder 420. Thus, the moveable member 130 is capable of moving the lens group 410 along the longitudinal direction of the barrel 430. As such, a distance between the lens group 410 and the image sensor 440 can be adjusted. In other words, focusing of the camera module 400 can be achieved by operation of the micro actuator 300.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A moveable assembly comprising:
a frame;
a plurality of resilient suspension arms each comprised of one or more carbon nanotube bundles; and
a moveable member;
the frame being disposed around the moveable member; and
each of the resilient suspension arms comprising a first end connected to the frame, and a second end connected to the moveable member, the resilient suspension arms being centro-symmetrically arranged relative to the moveable member such that the moveable member is capable of stably moving along a predetermined direction when driven by an external force.

2. The moveable assembly of claim 1, wherein the movement of the moveable member causes elastic deformation of the resilient suspension arms such that the resilient suspension arms counteract the external force.

3. The moveable assembly of claim 1, wherein the moveable member comprises a first side and an opposite second side, the resilient suspension arms comprising two first resilient suspension arms at the first side of the moveable member and two second resilient suspension arms at the second side of the moveable member.

4. The moveable assembly of claim 3, wherein the two first resilient suspension arms cross each other, and the two second resilient suspension arms cross each other.

5. The moveable assembly of claim 1, wherein the frame is comprised of material selected from the group consisting of iron, cobalt, nickel, iron oxide, cobalt oxide, nickel oxide, and any combination thereof.

6. The moveable assembly of claim 1, wherein the moveable member comprises a magnet.

7. A micro-actuator comprising:
a base, a moveable assembly, and a driver;
the moveable assembly being fixed to the base and comprising a frame, a plurality of resilient suspension arms each comprised of one or more carbon nanotube bundles, and a moveable member;
the frame being disposed around the moveable member;
each of the resilient suspension arms comprising a first end connected to the frame, and a second end connected to the moveable member, the resilient suspension arms being centro-symmetrically arranged relative to the moveable member; and
the driver being configured for driving the moveable member of the moveable assembly to stably move along a predetermined direction.

8. The micro-actuator of claim 7, wherein the moveable member comprises a first side and an opposite second side, the resilient suspension arms comprising two first resilient suspension arms at the first side of the moveable member and two second resilient suspension arms at the second side of the moveable member.

9. The micro-actuator of claim 8, wherein the two first resilient suspension arms cross each other, and the two second resilient suspension arms cross each other.

10. The micro-actuator of claim 7, wherein the frame is comprised of material selected from the group consisting of iron, cobalt, nickel, iron oxide, cobalt oxide, nickel oxide, and any combination thereof.

11. The micro-actuator of claim 7, wherein the moveable member comprises a first magnet, and the driver comprises an electromagnet.

12. The micro-actuator of claim 7, wherein the electromagnet of the driver is fixed relative to the base, and the first magnet is fixed to the moveable member.

13. The micro-actuator of claim 7, wherein the movement of the moveable member causes elastic deformation of the resilient suspension arms such that the resilient suspension arms counteract the external force.

14. A camera module comprising:
   a barrel holder, a barrel attached to the barrel holder, a lens holder received in the barrel, a lens received in the lens holder, a micro-actuator fixed to the barrel holder and connected to a connecting arm;
   the micro-actuator comprising a base, a moveable assembly, and a driver;
   the moveable assembly being fixed to the base and comprising a frame, a plurality of resilient suspension arms each comprised of one or more carbon nanotube bundles, and a moveable member;
   the frame being disposed around the moveable member;
   each of the resilient suspension arms comprising a first end connected to the frame, and a second end connected to the moveable member, the resilient suspension arms being centro-symmetrically arranged relative to the moveable member;
   the driver being configured for driving the moveable member of the moveable assembly to move along a lengthwise direction of the barrel;
   the barrel defining a guiding slot extending along the lengthwise direction thereof; and
   the connecting arm passing through the guiding slot, one end of the connecting arm being connected to the moveable member and another end of the connecting arm being connected to the lens holder.

15. The camera module of claim 14, wherein the movement of the moveable member causes elastic deformation of the resilient suspension arms such that the resilient suspension arms counteract the external force.

16. The camera module of claim 14, wherein the moveable member comprises a first side and an opposite second side, the resilient suspension arms comprising two first resilient suspension arms at the first side of the moveable member and two second resilient suspension arms at the second side of the moveable member.

17. The camera module of claim 16, wherein the two first resilient suspension arms cross each other, and the two second resilient suspension arms cross each other.

18. The camera module of claim 14, wherein the frame is comprised material selected from the group consisting of iron, cobalt, nickel, iron oxide, cobalt oxide, nickel oxide, and combination thereof.

19. The camera module of claim 14, wherein the driver comprises an electromagnet fixed relative to the base, and a magnet fixed to the moveable member.

* * * * *